(12) United States Patent
Liu et al.

(10) Patent No.: US 6,749,285 B2
(45) Date of Patent: Jun. 15, 2004

(54) METHOD OF MILLING REPEATABLE EXIT HOLES IN INK-JET NOZZLES

(75) Inventors: Xinbing Liu, Acton, MA (US); Chen-Hsiung Cheng, Chelmsford, MA (US); Dan Hogan, Acton, MA (US); Nancy Edwards, Essex Junction, VT (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/267,009

(22) Filed: Oct. 8, 2002

(65) Prior Publication Data

US 2004/0016095 A1 Jan. 29, 2004

Related U.S. Application Data

(60) Provisional application No. 60/398,639, filed on Jul. 25, 2002.

(51) Int. Cl.[7] ............... B41J 2/14; B41J 2/16; B23K 26/38
(52) U.S. Cl. ............. 347/47; 219/121.71; 700/166
(58) Field of Search ............ 219/121.7, 121.71; 347/47; 264/400; 216/27, 65; 700/166; 29/890.1

(56) References Cited

U.S. PATENT DOCUMENTS

| | | | | |
|---|---|---|---|---|
| 5,539,175 A | * | 7/1996 | Smith et al. | |
| 5,837,964 A | * | 11/1998 | Emer et al. | 219/121.71 |
| 6,361,152 B1 | * | 3/2002 | Fujisawa | |
| 2001/0045974 A1 | * | 11/2001 | Shoemaker et al. | 347/47 |
| 2002/0104831 A1 | * | 8/2002 | Chang et al. | |
| 2003/0103107 A1 | * | 6/2003 | Cheng et al. | 347/47 |

* cited by examiner

Primary Examiner—Geoffrey S. Evans
(74) Attorney, Agent, or Firm—Harness, Dickey & Pierce, PLC

(57) ABSTRACT

A method of laser milling an aperture in a workpiece for use with manufacturing ink-jet nozzles includes initially illuminating a surface of the workpiece with a laser beam at a point within an outer perimeter of a desired aperture and a distance away from the outer perimeter sufficient to substantially avoid initial ablation of the outer perimeter. The laser beam is driven substantially in the direction of the outer perimeter at a variable rate controlled to avoid deformation of the outer perimeter. Material of the workpiece is ablated in a pattern designed to substantially remove material within the outer perimeter, thereby forming the aperture.

33 Claims, 9 Drawing Sheets

METHOD OF MILLING REPEATABLE EXIT HOLES IN INK-JET NOZZLES

CROSS-REFERENCE TO RELATED APPLICATIONS

This application claims the benefit of U.S. Provisional Application Serial No. 60/398,639 which was filed on Jul. 25, 2002 and is incorporated by reference herein.

FIELD OF THE INVENTION

The present invention generally relates to laser drilling, and particularly relates to a method for milling repeatable exit holes in ink jet nozzles.

BACKGROUND OF THE INVENTION

Material ablation by pulsed light sources has been studied since the invention of the laser. Etching of polymers by ultraviolet (UV) excimer laser radiation in the early 1980s led to further investigations and developments in micromachining approaches using lasers—spurred by the remarkably small features that can be drilled, milled, and replicated through the use of lasers. A recent article entitled "Precise drilling with short pulsed lasers" (X. Chen and F. Tomoo, High Power Lasers in Manufacturing, Proceedings of the SPIE Vol. 3888, 2000) outlines a number of key considerations in micromachining. Other recent patents of interest include the following:

U.S. Pat. No. 6,260,957, "Ink jet printhead with heater chip ink filter," describes a silicon ink filter for a heater chip of an ink jet printhead that is formed by micromachining and laser drilling. The heater chip may contain a plurality of such filters for the plurality of nozzles of the printhead. The filter has a via constituting an ink entrance area formed by micromachining and a plurality of bores formed at the exit side of the via produced by laser drilling. Protective layers are preferably disposed over the heater chip substrate prior to micromachining and laser drilling.

U.S. Pat. No. 6,089,698, "Nozzles and methods of and apparatus for forming nozzles," describes nozzles for an ink jet printer formed by laser ablation in a nozzle plate that has previously been bonded to the body of the printer. The laser beam is caused to converge at a point in front of the nozzle plate so that a nozzle is formed which tapers toward the outlet. First and second beam masks are established in front of a focusing lens with the masks being respectively conjugate in the lens with the nozzle inlet and outlet, which are of different shape. The nozzle has a central land that controls the ink meniscus and avoids the ejected drop receiving a sideways kick from the nozzle wall.

U.S. Pat. No. 6,023,041, "Method for using photoabsorptive coatings and consumable copper to control exit via redeposit as well as diameter variance," describes a method of forming a through-via in a laminated substrate by applying a polymeric photo-absorptive layer on an exposed bottom surface of a laminated substrate. A through-via is laser drilled in the substrate from a top of the substrate through the substrate to a bottom of the substrate. The photo-absorptive layer formed on the bottom surface of the substrate is then removed.

European Patent No. EP0867294, "Ink jet printhead nozzle plates," describes a method for making an inkjet printhead nozzle plate from a composite strip containing a nozzle layer and an adhesive layer. The adhesive layer is coated with a polymeric sacrificial layer prior to laser ablating the flow features in the composite strip. A method is also provided for improving adhesion between the adhesive layer and the sacrificial layer. Once the composite strip containing the sacrificial layer is prepared, the coated composite strip is then laser abated to form flow features in the strip in order to form the nozzle plates. After forming the flow features, the sacrificial layer is removed. Individual inkjet printhead nozzle plates are separated from the composite strip by singulating the nozzle plates with a laser.

U.S. Pat. No. 5,548,894, "Ink jet head having ink-jet holes partially formed by laser-cutting, and method of manufacturing the same," describes a method of manufacturing an ink jet head including an ink-chamber member having ink chambers, and a nozzle plate secured to a front end face of the ink-chamber member and which has ink-jet holes communicating with the respective ink chambers, wherein a blank for the nozzle plate is formed by injection molding, such that blind holes are formed in one of opposite surfaces of the blank and such that each blind hole has a varying-area portion whose cross sectional area decreases in a direction from the above-indicated one of opposite surfaces of the blank toward the other surface, and the blank is subjected to laser-cutting to prepare the nozzle plate having orifice holes which cooperate with the blind holes to form the ink-jet holes. The size of each blind hole at an open end thereof is preferably smaller than the size of the ink chamber at an end thereof at which the ink chamber communicates with the ink-jet hole.

Ultrafast lasers generate intense laser pulses with durations from roughly $10^{-11}$ seconds (10 picoseconds) to $10^{-14}$ seconds (10 femtoseconds). Short pulse lasers generate intense laser pulses with durations from roughly $10^{-10}$ seconds (100 picoseconds) to $10^{-11}$ seconds (10 picoseconds). Along with a wide variety of potential applications for ultrafast and short pulse lasers in medicine, chemistry, and communications, short pulse lasers are also useful in milling or drilling holes in a wide range of materials. In this regard, hole sizes in the sub-micron range are readily drilled by these lasers. High aspect ratio holes are also drilled in hard materials; applications in this regard include cooling channels in turbine blades, nozzles in ink-jet printers, and via holes in printed circuit boards.

Creation of a repeatable hole shape that meets stringent specifications is frequently critical in quality control for manufacturing applications. Laser systems are flexible in meeting such specifications in milling because appropriate programming can easily engineer custom-designed two-dimensional (2D) and three-dimensional (3D) structures and translate such designs into numerical control of the laser in real-time. However, as the required feature size for these structures decreases, mass production of quality micromachined products becomes more difficult to conduct in a rapid, cost-effective manner that consistently meets product specifications.

Key factors in inkjet printer quality derive from inkjet nozzle design, construction techniques, and operation. Nozzle design defines a need for a number of holes to be milled in the aforementioned materials. Each nozzle hole includes a shaped section and an exit hole. The exit hole is critical in controlling ink ejection from an inkjet printer nozzle. Inconsistent expulsion of ink leads to poor print quality; therefore, imperfections in the exit hole negatively impact print quality.

Manufacturers of inkjet printers require that inkjet nozzle holes meet specific workpiece geometry. The measurements (e.g., input diameter, exit diameter, depth of exit hole, and taper angle) of the hole and shape of the hole (e.g., tapered with cylindrical exit hole) are critical to the product quality and the operation of the end application. In addition, inkjet nozzle manufacturing must provide manufacturing methods of laser tool operation, material controls, and inspection to achieve repeatable size and shape to ensure consistency among mass-produced nozzles.

Although laser drilling inkjet nozzles provides numerous advantages and benefits over other drilling methods, defects in the final product remain a problem. Current laser drilling systems, such as those using picosecond lasers, still create defects, such as burrs and notches, in the finished product. These defects are particularly detrimental in the exit hole because the size and smoothness aspects of the exit hole are critical to acceptable inkjet nozzle performance. Burrs or notches cause restrictions in the high velocity expulsion of inks and cause variability in the position and amount of ink per dot; burrs and noteches therefore diminish print quality. Many current laser drilling techniques utilizing short pulse, low energy lasers use traditional trepanning (e.g. cutting a circular pattern to remove a core, leaving a hole) to create the exit hole. This trepanning method causes an unpredictable notch or burr to be formed in the otherwise cylindrical exit hole. As previously noted, this notch or burr is undesirable because of its negative impact on print quality. What is needed is a way to minimize these defects in laser drilling inkjet nozzles to enhance quality and consistency in manufactured inkjet nozzle. The present invention provides a solution to this need.

SUMMARY OF THE INVENTION

According to the present invention, a method of laser milling an aperture in a workpiece for use with manufacturing ink-jet nozzles includes initially illuminating a surface of the workpiece with a laser beam at a point within an outer perimeter of a desired aperture and a distance away from the outer perimeter sufficient to substantially avoid initial ablation of the outer perimeter. The laser beam is driven substantially in the direction of the outer perimeter at a variable rate controlled to avoid deformation of the outer perimeter. Material of the workpiece is ablated in a pattern designed to substantially remove material within the outer perimeter, thereby forming the aperture.

A number of advantages are provided with the invention. Print quality in inkjet printers is generally improved even as quality and consistency in manufacturing inkjet nozzles is also improved. Defects in laser drilling inkjet nozzle holes are minimized. The elimination of notching provides for repeatable exit holes in inkjet nozzles. The method and system of the present invention also add little cost to the manufacturing of inkjet nozzles insofar as the method can be implemented using currently-deployed systems and additional tools to the conventional components of a laser drilling system are not required in many cases.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
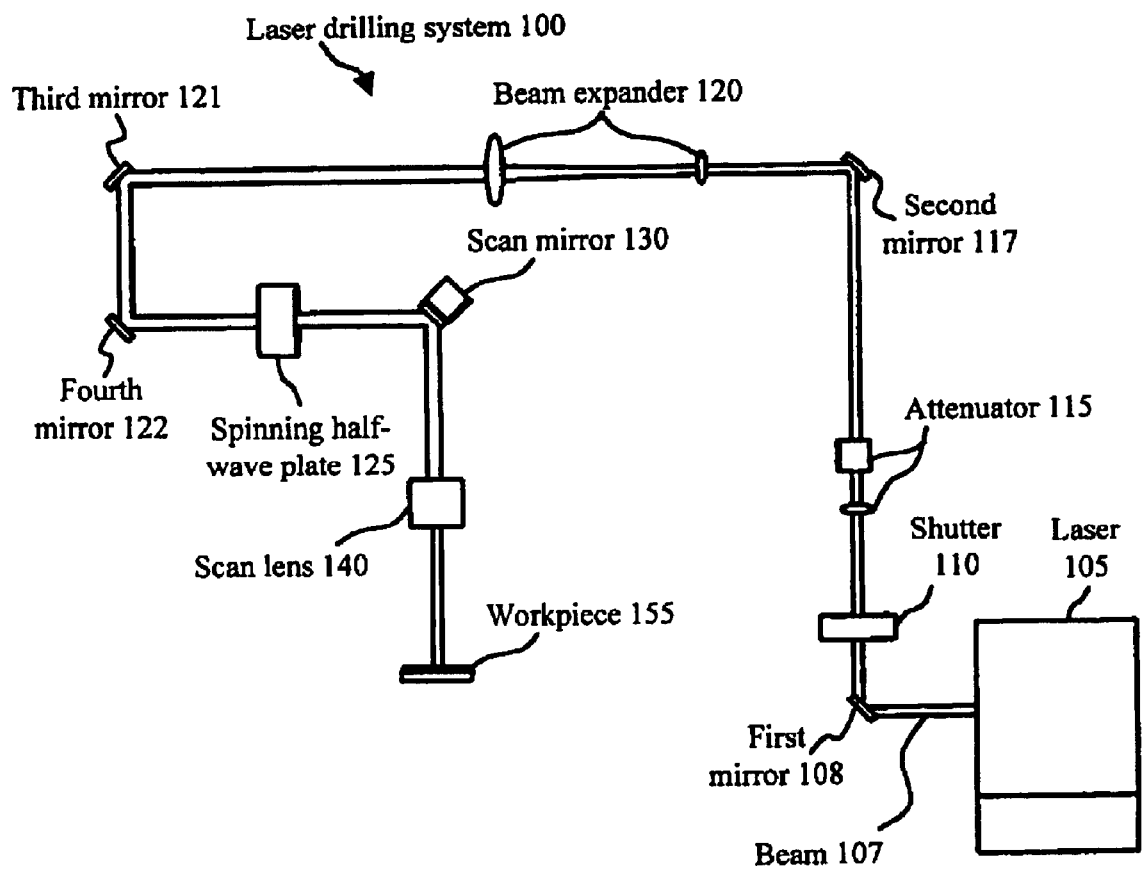
FIG. 1 presents a schematic of a laser drilling system.

The following description of the preferred embodiment(s) is merely exemplary in nature and is in no way intended to limit the invention, its application, or uses.

In overview, one embodiment of the present invention provides a method of creating repeatable exit holes meeting required shape specifications with a laser drilling system by punching through the workpiece at a radius A which is less than the radius B of the exit hole, maneuvering the laser to the exit hole diameter, and circling around the exit hole diameter. In another embodiment, an overview of the present invention provides removal of an initial mass X from the hole, where mass X is less than the total mass Y to be ultimately removed from the hole, and then removing the remaining mass Y-X. In implementing all cutting, the required specifications contemplate an essential conformance between the actual excision edge to the ideal perimeter (which is pursued by the laser in cutting that excision edge) to within a predetermined threshold value (or threshold function if the tolerance modifies along the perimeter) so that acceptable quality in performance of the exit holes or other holes is fully realized.

The two embodiments reflect resolution of two distinct theories surrounding the cause of a "tuna can effect"—that is, a single burr or notch in the exit hole. One such theory is that the notch or burr in the exit hole that is caused at the point where the laser beam first "punches through" the material at the exit hole perimeter. The punch-through in the first embodiment overviewed resolves this insofar as the punch-through is controlled to occur at a point that is not located on the perimeter (e.g. at a point less than the finished diameter of the exit hole), so that the notch is eliminated. The second theory is that burrs or notches are generated when the laser beam drills the exit hole, progressively removes material from the section of the exit hole area, and the mass of the material being ablated eventually causes an uneven break or notch in the exit hole. This second embodiment overviewed resolves this insofar as a portion of material is removed from the exit hole prior to the final finishing step, so that when the exit hole is finished at final diameter, the amount of mass has been reduced, thus minimizing the size of the notch or eliminating it altogether. In both embodiments, a determination of the material ablation rate from the workpiece when incised by the cutting beam is used to define the rate of material removal at any moment; a punch hole location needs to be defined within the portion of material to be removed at a distance from the perimeter such that the material ablation rate and the spot size of the laser minimize distortion of the excision edge to less than a threshold value (specified tolerance of imperfection in the excision edge) when the cutting beam cuts a pilot hole in the workpiece; a laser beam path needs to be defined which provides sufficient distance from the perimeter such that the material ablation rate and the spot size minimize distortion of the excision edge to less than the predetermined threshold value when the cutting beam progressively incises the workpiece; and a beam progression rate function needs to be effectively determined for moving the cutting beam along the beam path as a function of the position of the beam respective to the perimeter such that the material ablation rate and the spot size minimize distortion of the excision edge to less than the predetermined threshold value as the cutting beam progressively incises the workpiece.

Turning now to specific details in the embodiments, FIG. 1 shows a simplified schematic of a laser drilling system 100, including a laser 105, a beam 107, a first mirror 108, a second mirror 117, a third mirror 121, a fourth mirror 122, a shutter 110, an attenuator 115, a beam expander 120, a spinning half-wave plate 125, a scan mirror 130, a scan lens 140, and a workpiece 155, arranged as shown. In one embodiment, laser 105 is a picosecond laser system.

In operation, laser 105 emits beam 107 along the optical path between Laser 105 and Workpiece 155. Beam 107 propagates along the optical path, where it is incident upon first mirror 108. First mirror 108 redirects beam 107 along the optical path, where it is incident upon shutter 110. Shutter 110 opens and closes to selectively illuminate the workpiece material. Beam 107 exits shutter 110 and propagates along the optical path to attenuator 115. Attenuator 115 filters the energy of laser 105 in order to precisely control ablation parameters. Beam 107 exits attenuator 115 and propagates along the optical path, where it is incident upon second mirror 117. Second mirror 117 redirects beam 107 along the optical path, where it is incident upon beam expander 120.

Beam expander 120 increases the size of beam 107 to match the pupil size of scan lens 140. Beam 107 exits beam expander 120 and propagates along the optical path, where it is incident upon third mirror 121. Third mirror 121 redirects beam 107 along the optical path, where it is incident upon fourth mirror 122. Fourth mirror 122 redirects beam 107 along the optical path, where it is incident upon spinning half-wave plate 125. Spinning half-wave plate 125 changes the polarization of beam 107. Upon exiting spinning half-wave plate 125, beam 107 propagates along the optical path, where it is incident upon scan mirror 130.

Scan mirror 130 moves in a pre-defined pattern using a milling algorithm in real-time execution by a control computer (not shown but which should be apparent) to drill the holes in workpiece 155. Scan mirror 130 redirects beam 107 along the optical path, where it is incident upon scan lens 140. Scan lens 140 determines the spot size of beam 107 upon workpiece 155. Beam 107 exits scan lens 140 and propagates along the optical path, where it is incident upon workpiece 155. Beam 107 ablates workpiece 155 in a pattern according to the pre-defined milling algorithm. The milling algorithm is defined and communicated to laser drilling system 100 with a computer (not shown). The computer sends signals to shutter 110 and scan mirror 130 according to the parameters specified in the milling algorithm.

Figure 2:
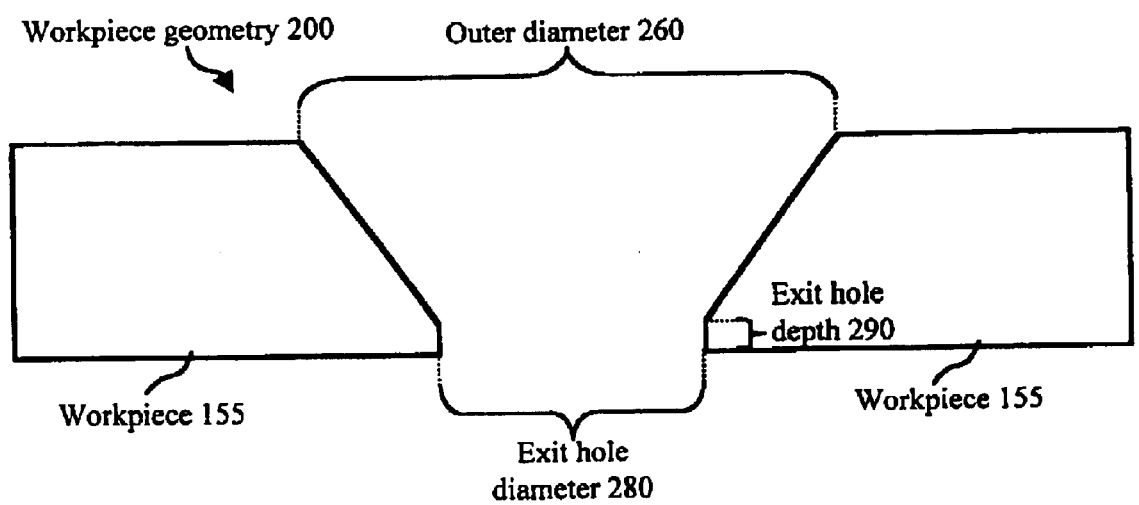
FIG. 2 shows cross-section detail in an exemplary workpiece geometry drilled using laser drilling system.

FIG. 2 shows workpiece geometry 200 as a cross-section, including workpiece 155, an outer diameter 260, an exit hole diameter 280, and an exit hole depth 290.

Workpiece geometry 200 is a cross-section of a cone-shaped hole in an inkjet nozzle, which can be drilled using laser drilling system 100. However, workpiece geometry 200 is provided as one embodiment and the present invention is not limited to use with this shape.

Specific parameters for workpiece geometry 200, including outer diameter 260, exit hole diameter 280, and exit hole depth 290, are measurements specified according to requirements of the inkjet cartridge manufacturer.

Figure 3:
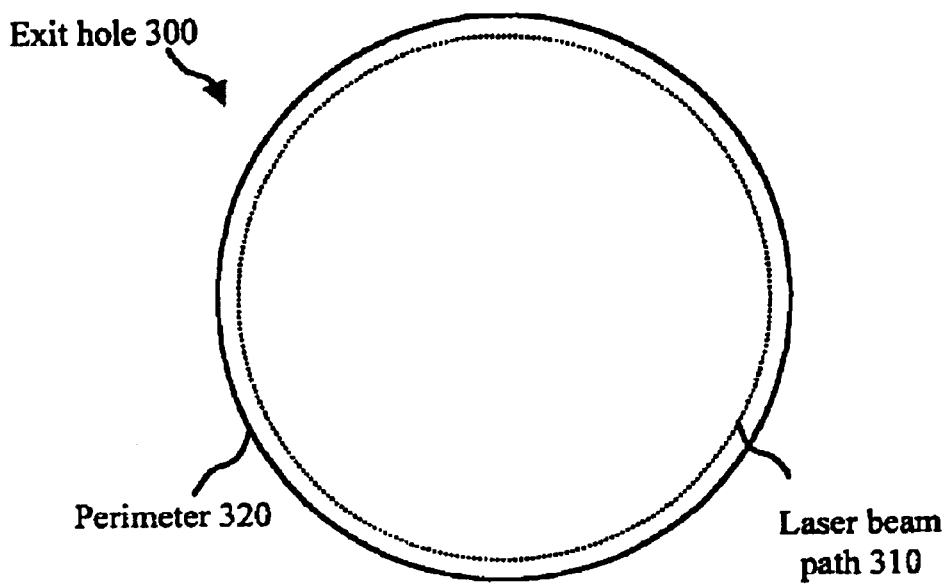
FIG. 3 shows an exit hole finished using traditional trepanning techniques.
Figure 4:
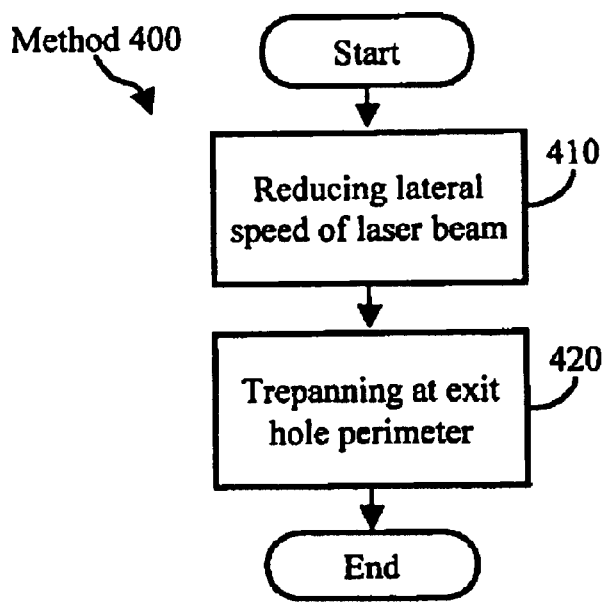
FIG. 4 illustrates a prior art method of finishing exit holes in inkjet nozzles using traditional trepanning techniques.

Turning now to a consideration of the prior art, FIGS. 3 and 4 illustrate a prior art method of finishing exit holes in inkjet nozzles using traditional trepanning techniques. FIG. 3 is an illustration of an exit hole 300, created with the trepanning technique described in FIG. 4 and including a laser beam path 310 and a perimeter 320. Perimeter 320 is defined by the radius as measured from the centerpoint of exit hole 300.

For purposes of clarity, the distance between laser beam path 310 and perimeter 320 may be as large as 20 $\mu$m. The actual distance between laser beam path 310 and perimeter 320 is set according to the spot size of laser beam 107 and the ablation rate (amount of material removed by laser beam 107 in a specified time) to meet the pre-determined workpiece geometry.

FIG. 4 illustrates a method 400 of finishing exit holes in inkjet nozzles using traditional trepanning techniques, including the following steps:

In Step 410, reducing lateral speed of laser beam, the lateral speed (a scalar component of the angular velocity) of laser beam 107 is reduced from the speed used in milling the shaped hole by 50 to 90 percent to a slower speed used to finish cylindrical exit hole 300. Slower speeds tend to provide a better defined circular hole shape. In one embodiment, the nozzle hole and cylindrical exit hole 300 is shaped according to workpiece geometry 200, as shown in FIG. 2.

In Step 420, trepanning at exit hole perimeter, laser beam 107 is circled repeatedly at perimeter 320 until sufficient material is ablated to cause separation of the material inside laser beam path 310. This results in an exit hole 300 with a radius that meets the pre-determined workpiece geometry.

Figure 5:
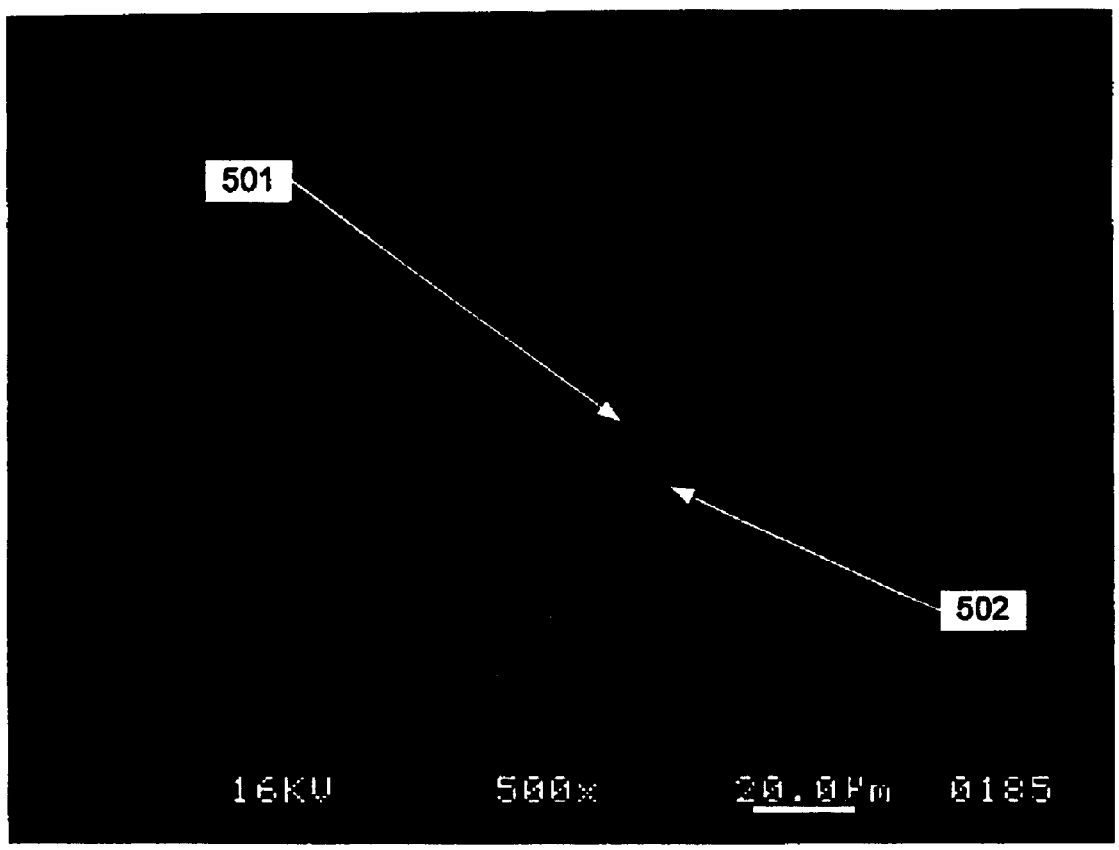
FIG. 5 provides a derived image from a photo of an inkjet nozzle hole with a notching problem.

FIG. 5 provides a derived image from a photo of an inkjet nozzle hole with a notching problem to show the actual results of drilling inkjet nozzle holes and the notches according the above-described prior art methodology. Note the notch 501 in the exit hole 502.

Turning now to a description of embodiments according to the present invention, key improvements are embedded in the milling algorithms that define how shapes are drilled in workpiece 155.

As noted in the overview at the beginning of the discussion of the preferred embodiments, the present invention provides considerations in creating repeatable exit holes meeting required shape specifications with a laser drilling system. These considerations are based on two distinct theories surrounding the cause of a "tuna can effect", that is, a single burr or notch in the exit holes upon finishing.

The first consideration eliminates the notch or burr in the exit hole that is caused at the point where laser beam 107 first "punches through" (when beam 107 reaches the full depth of, and initially pierces workpiece 155) the material at the exit hole perimeter. The punch-through is controlled to occur at a point that is not located on the perimeter (e.g. at a point less than the finished diameter of the exit hole), so that the notch is eliminated.

The second consideration removes burrs or notches that are generated when laser beam 107 drills the exit hole, progressively removes material from the section of the exit hole area, and the mass of the material being ablated eventually causes an uneven break or notch in the exit hole. This second method involves removing a portion of material from the exit hole prior to the final finishing step, so that when the exit hole is finished at final diameter, the amount of mass has been reduced, thus minimizing the size of the notch or eliminating it altogether.

Figure 6:
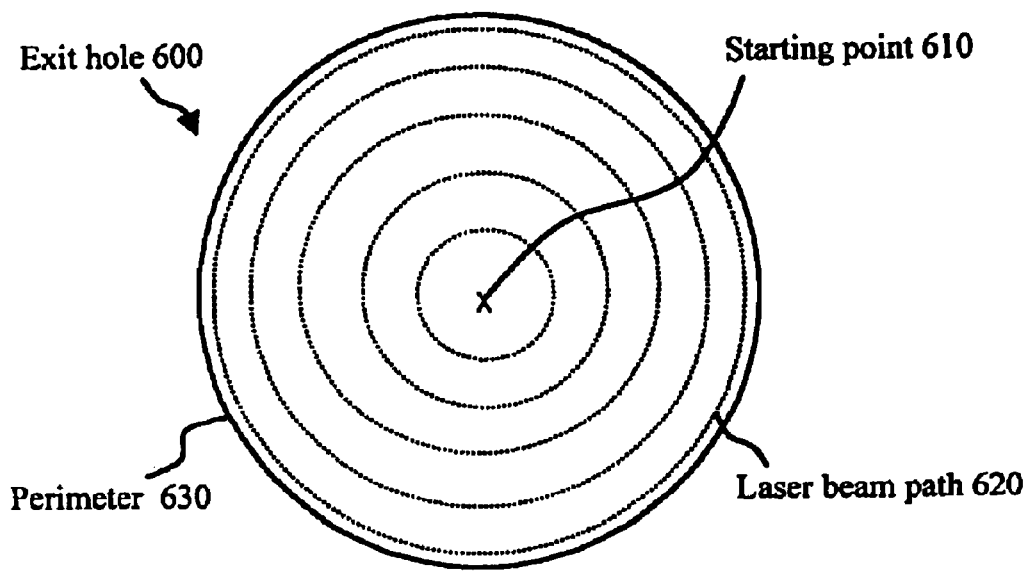
FIG. 6 shows an exit hole finished with punch-through and spiral technique.
Figure 7:
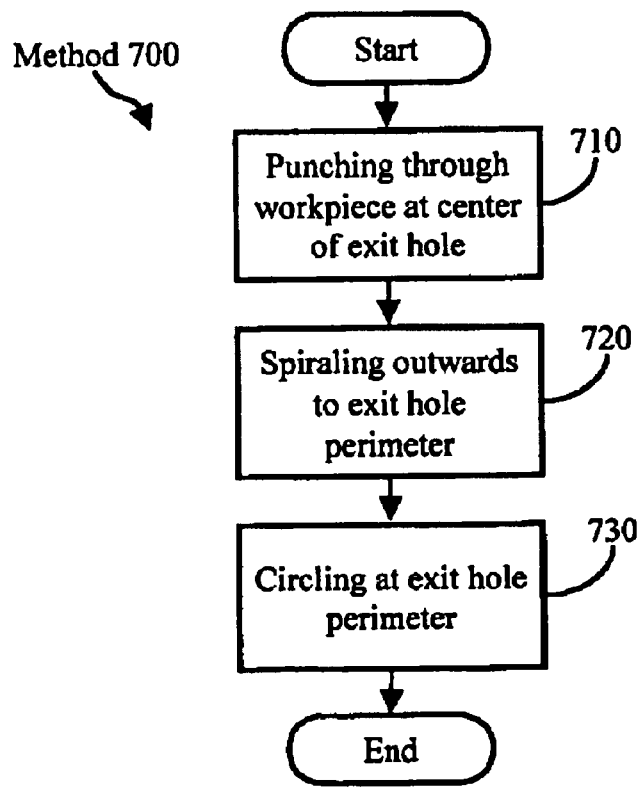
FIG. 7 illustrates a method of finishing exit holes in inkjet nozzles using a punch-through and spiral technique.

In further detail, FIGS. 6 and 7 illustrate a method of finishing exit holes in inkjet nozzles using a punch-through and spiral technique. FIG. 6 shows an exit hole 600, created with the punch-through and spiral technique described in FIG. 7 and including a starting point 610, a laser beam path 620, and a perimeter 630.

For purposes of clarity, the distance between laser beam path 620 and perimeter 630 may be as large as 20 $\mu$m. The actual distance between laser beam path 620 and perimeter 630 is set according to the spot size of laser beam 107 and the ablation rate (amount of material removed by laser beam 107 in a specified time) to meet the pre-determined workpiece geometry.

FIG. 7 illustrates a method 700 of finishing exit holes in inkjet nozzles using a punch-through and spiral technique.

In Step 710, Punching through workpiece at center of exit hole, laser beam 107 is focused at the center of exit hole 600 until it punches through workpiece 155.

In Step 720, Spiraling outwards to exit hole perimeter, laser beam 107 is gradually spiraled along laser beam path 620 from starting point 610 at the center point, to exit hole perimeter 630 at a rate of 0.1 sec/revolution to 1 sec/revolution. As laser beam 107 spirals, workpiece 155 material is ablated, causing separation of the material inside laser beam path 620, and exit hole 600 grows until laser beam 107 reaches perimeter 630.

In Step 730, circling at exit hole perimeter, laser beam 107 is circled at perimeter 630 at a rate of 0.1 sec/revolution to 1 sec/revolution to finish exit hole 600 with a round perimeter 630.

As the specifics of the instantaneous progression rate of beam 107 respective to the location of beam 107 to each position on the locus of points defining perimeter 630 are resolved for progression around perimeter 630, Steps 720 and 730 proceed according to a beam progression rate function for moving the cutting beam 107 along the beam path as a function of the position of beam 107 respective to perimeter 630 such that the material ablation rate and the spot size minimize distortion of the edge of exit hole 600 to less than a predetermined threshold value as cutting beam 107 progressively incises the nozzle plate body. Such a function is first determined empirically for a particular design of workpiece 115, and then the function is either expressed in the control program of a computer controlling beam 107 or taught to a technician operating beam 107. Other embodiments either embed the function in electrical control circuitry or in the design of a mechanical cam.

Method 700 eliminates burrs or notches in the final exit hole 600 caused by laser beam 107 punch-through because the damaging punch-through occurs at a location inside and away from perimeter 630.

Figure 8:
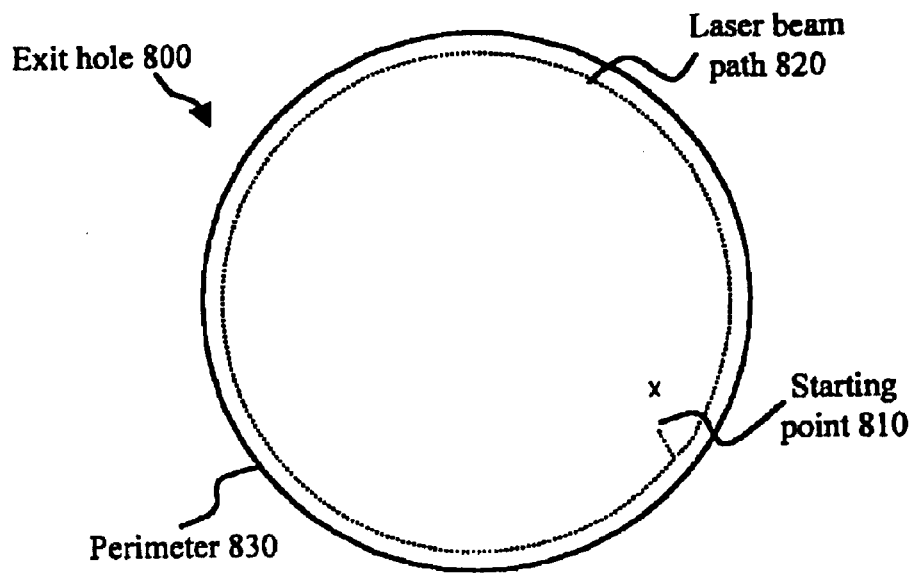
FIG. 8 shows an exit hole finished using punch-through and slow circling technique.
Figure 9:
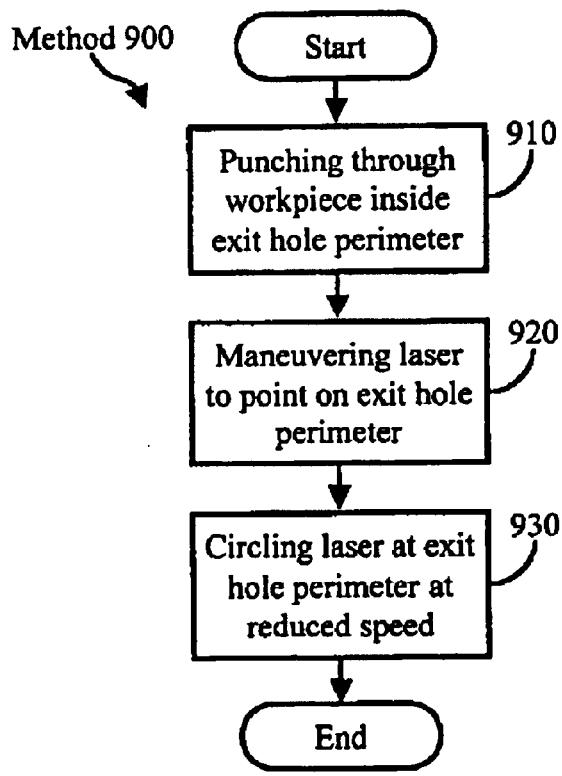
FIG. 9 illustrates a method of finishing exit holes in inkjet nozzles using a punch-through and slow circling technique.

In a further embodiment, FIGS. 8 and 9 illustrate a method of finishing exit holes in inkjet nozzles using a punch-through and slow circling technique. FIG. 8 shows an exit hole 800, created with the punch-through and slow circling technique described in FIG. 9, including a starting point 810, a laser beam path 820, and a perimeter 830.

For purposes of clarity, the distance between laser beam path 820 and perimeter 830 may be as large as 20 $\mu$m. The actual distance between laser beam path 820 and perimeter 830 is set according to the spot size of laser beam 107 and the ablation rate (amount of material removed by laser beam 107 in a specified time or as a function of time in the cutting cycle) to meet the predetermined workpiece geometry.

FIG. 9 illustrates a method 900 of finishing exit holes in inkjet nozzles using a punch-through and slow circling technique.

In Step 910, Punching through workpiece inside exit hole perimeter, laser beam 107 focuses on starting point 810, which is located at a point inside perimeter 830 of exit hole 800, and punches through workpiece 155.

In Step 920, Maneuvering laser beam to point on exit hole perimeter, laser beam 107 is maneuvered from starting point 810 to a point on perimeter 830.

In Step 930, Circling laser at exit hole perimeter at reduced speed, laser beam 107 is circled slowly at perimeter 830 at a rate of 0.1 sec/revolution to 1 sec/revolution until sufficient material is ablated to cause separation of the material inside laser beam path 820. This results in an exit hole 800 with a radius that meets pre-determined workpiece geometry within a predefined tolerance defined by a threshold value. Laser beam path 820 continues until laser beam 107 has completed 360 degrees at exit hole perimeter 830.

Method 900 eliminates burrs or notches in the final exit hole 800 caused by laser beam 107 punch-through because the damaging punch-through occurs at a location inside and away from perimeter 830.

Figure 10:
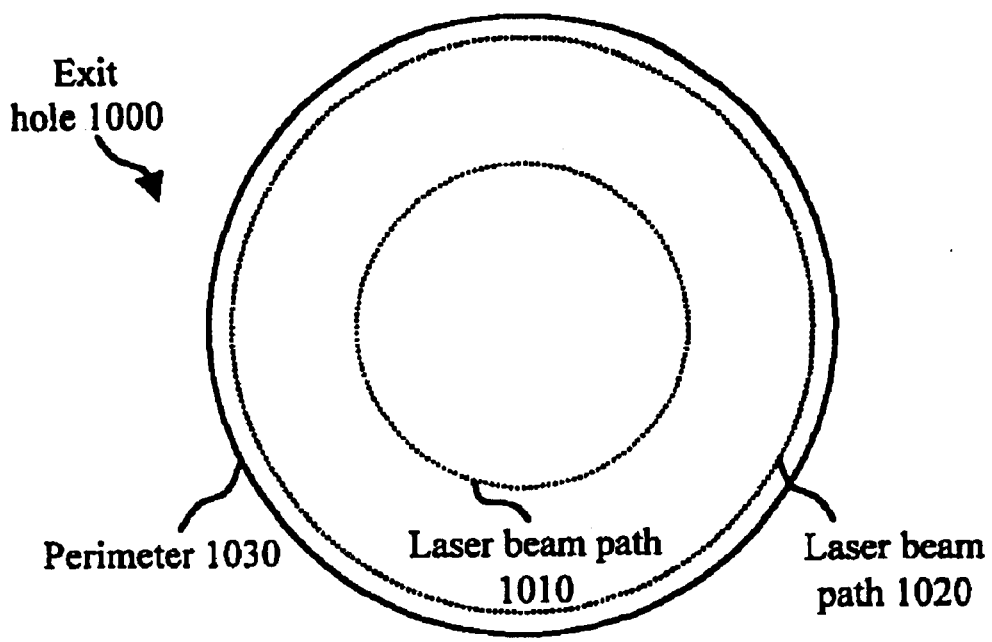
FIG. 10 shows an exit hole finished using a two-pass trepanning technique.
Figure 11:
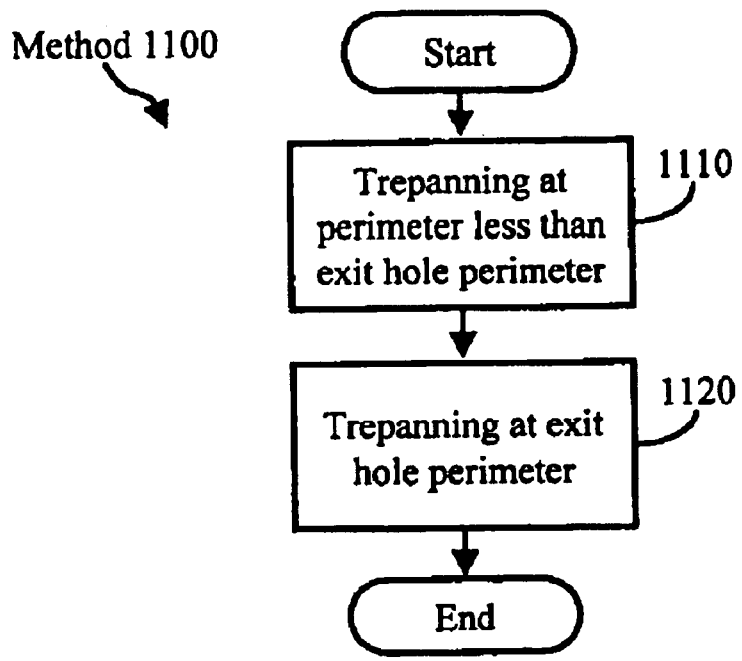
FIG. 11 illustrates a method of finishing exit holes in inkjet nozzles using a two-pass trepanning technique.

Illustrating yet another embodiment, FIGS. 10 and 11 illustrate a method of finishing exit holes in inkjet nozzles using a two-pass trepanning technique. FIG. 10 shows an exit hole 1000, created with the two-pass trepanning technique described in FIG. 11, including a laser beam path 1010, a laser beam path 1020, and a perimeter 1030.

FIG. 11 illustrates a method 1100 of finishing exit holes in inkjet nozzles using a two-pass trepanning technique, including the following steps:

In Step 1110, Trepanning at perimeter less than exit hole perimeter, laser beam 107 is circled repeatedly at laser beam path 1010 at a rate of 0.1 sec/revolution to 1 sec/revolution until sufficient material is ablated to cause separation of the material inside laser beam path 1010.

In Step 1120, Trepanning at exit hole perimeter, laser beam 107 is circled repeatedly at perimeter 1030 at a rate of 0.1 sec/revolution to 1 sec/revolution until sufficient material is ablated to cause separation of the material inside laser beam path 1020. This results in an exit hole 1000 with a radius that meets pre-determined workpiece geometry.

Method 1100 eliminates burrs or notches in final exit hole 1000 caused by the mass of exit hole 1000 material creating a notch or burr in exit hole 1000, because a portion of material from exit hole 1000 is removed prior to the final finishing step, such that when exit hole 1000 is finished at its final diameter, the amount of mass is reduced, thus minimizing the size of the notch or eliminating it altogether.

The above approaches are further augmented in another embodiment by securing an etchable material layer to the beam exit surface of the nozzle plate body, controlling the continuous incision to cut through said nozzle plate body to the interface between the nozzle plate body and the etchable material, and etching away the etchable material after the cutting beam has fully traversed the beam path (see the discussions of U.S. Pat. No. 6,023,041 and EP0867294 as referenced in the Background discussion of this Specification).

Figure 12:
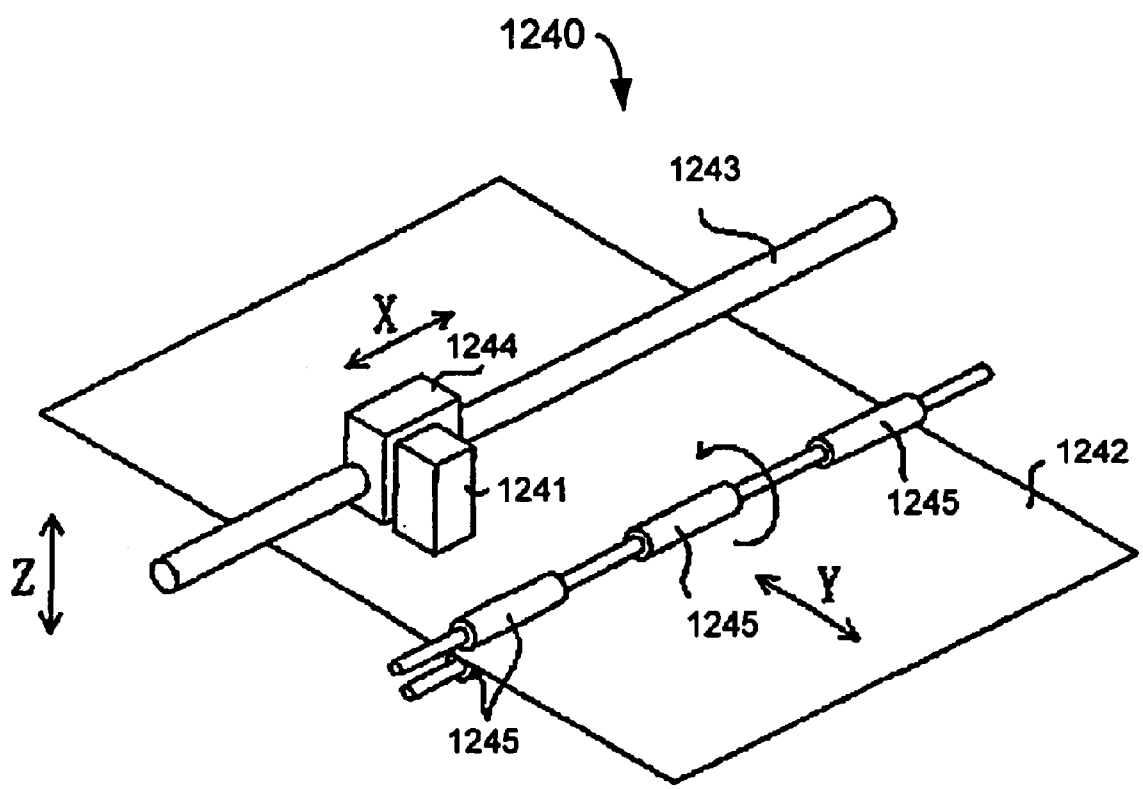
FIG. 12 provides a perspective view showing major constituent components of an ink-jet printer.
Figure 13:
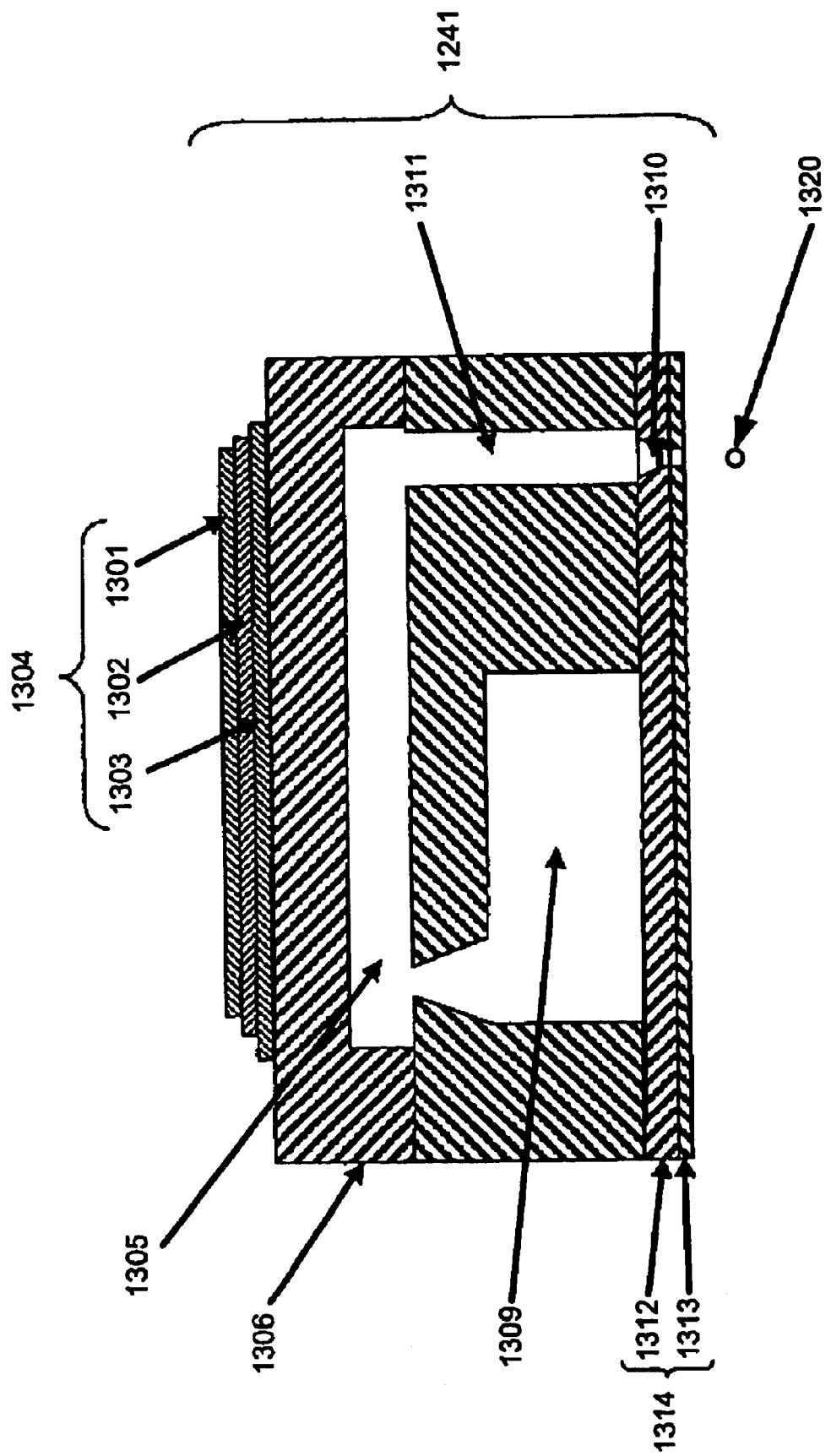
FIG. 13 a schematic cross-sectional view of an ink-jet head.

A nozzle plate of an ink-jet head may be constructed with the laser drilling system of the present invention as further detailed in FIGS. 12 and 13.

As shown in FIG. 12, an ink-jet printer 1240 has an ink-jet head 1241 capable of recording on a recording medium 1242 via a pressure generator. Ink droplets emitted from ink-jet head 1241 are deposited on the recording medium 1242, such as a sheet of copy paper, so that recording can be performed on the recording medium 1242. The ink-jet head 1241 is mounted on a carriage 1244 capable of reciprocating movement along a carriage shaft 1243. More specifically, the ink-jet head 1241 is structured such that it can reciprocate in a primary scanning direction X in parallel with the carriage shaft 1243. The recording medium 1242 is timely conveyed by rollers 1245 in a secondary scanning direction Y. The ink-jet head 1241 and the recording medium 1242 are relatively moved by the rollers 1245.

Turning now to FIG. 13, further details in in-jet head 1241 are shown. Pressure generator 1304 is preferably a piezoelectric system, a thermal system, and/or equivalent system. In this embodiment, the pressure generator 1304 corresponds to a piezoelectric system which comprises an upper electrode 1301, a piezoelectric element 1302, and an under electrode 1303. A nozzle plate 1314 (an instance of workpiece 155) comprises a nozzle substrate 1312 and a water repellent layer 1313. The nozzle substrate 1312 is made of metal, resin and/or equivalent material. The water repellant layer is made of fluororesin or silicone resin. In this embodiment, the nozzle substrate 1312 is made of stainless steel and has a thickness of 50 um, and the water repellent layer is made of a fluororesin and has a thickness of 0.1 um. The ink-jet ink is filled in an ink supplying passage 1309, a pressure chamber 1305, an ink passage 1311, a nozzle 1310. Ink droplets 1320 are ejected from nozzle 1310 as pressure generator 1304 pushes on pressure chamber element 1306.

As a result of the present invention, very good nozzles are formed without flash and foreign matter (carbon etc) in the nozzle plate. Further, the accuracy of the nozzle outlet diameter is 20 um±1.5 um (a preferred predefined acceptable threshold value for tolerance between the perimeter and the excision edge of the 20 um diameter nozzle outlet).

From the foregoing it will be understood that the present invention provides a provides a system and method for removing a portion from a workpiece with a laser cutting tool with special value in using a laser to mill exit holes in inkjet nozzles. While the invention has been described in its presently preferred form, it will be understood that the invention is capable of certain modification without departing from the spirit of the invention as set forth in the appended claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of laser milling an aperture in a workpiece for use with manufacturing ink-jet nozzles, comprising:

initially illuminating a surface of the workpiece with a laser beam at a point within an outer perimeter of a desired aperture and a distance away from the outer perimeter sufficient to substantially avoid initial ablation of the outer perimeter;

driving the laser beam substantially in the direction of the outer perimeter at a variable rate controlled to avoid deformation of the outer perimeter; and ablating material of the workpiece in a pattern designed to substantially remove material within the outer perimeter, thereby forming the aperture.

2. The method of claim 1 comprising:

calculating a minimum distance as a function of ablation rate of material of the workpiece and as a function of a spot size of the laser beam; and initially illuminating the surface of the workpiece with the laser beam at a point within the outer perimeter of the desired aperture that is at least the minimum distance away from the outer perimeter.

3. The method of claim 2 comprising experimentally determining the ablation rate of material comprising the workpiece when illuminated by the laser beam.

4. The method of claim 1 comprising:

experimentally identifying a safe zone of initial illumination on the surface of the workpiece within the outer perimeter based on results of similar drilling operations; and initially illuminating a surface of the workpiece with the laser beam at a point within the experimentally identified safe zone.

5. The method of claim 1, wherein the desired aperture corresponds to an exit hole, the method comprising:

punching through the workpiece at a center point of the exit hole;

spiraling the laser beam outwards to a perimeter of the exit hole; and circling the laser at the perimeter of the exit hole.

6. The method of claim 5, wherein the workpiece corresponds to a nozzle plate for an ink-jet head.

7. A method of manufacturing an ink-jet head, comprising:

forming the aperture in the workpiece according to the method of claim 6; and operably coupling said workpiece to an ink-jet head body having an ink passage, a pressure chamber, and a pressure generator.

8. The method of claim 1, wherein the desired aperture corresponds to an exit hole, comprising:

trepanning at a diameter less than the exit hole perimeter; and trepanning at the exit hole perimeter.

9. The method of claim 1, wherein the desired aperture corresponds to an exit hole for an ink-jet nozzle.

10. A method of laser milling an aperture corresponding to an exit hole for use with manufacturing ink-jet nozzles, comprising:

initially illuminating a surface of the workpiece with a laser beam at a point within an outer perimeter of a desired aperture and a distance away from the outer perimeter sufficient to substantially avoid initial ablation of the outer perimeter;

driving the laser beam substantially in the direction of the outer perimeter at a variable rate controlled to avoid deformation of the outer perimeter;

ablating material of the workpiece in a pattern designed to substantially remove material within the outer perimeter, thereby forming a vertical wall of the aperture;

punching through the workpiece at a point inside a perimeter of the exit hole;

maneuvering the laser beam to a point on the perimeter of the exit hole at a first speed; and circling the laser at the perimeter of the exit hole at a second speed less than the first speed.

11. A method of removing a portion from a workpiece with a laser cutting tool, said portion having a pre-determined perimeter defining the outer boundary of said portion and a commensurate excision edge in said workpiece, said laser cutting tool providing a cutting beam having a spot size, said method comprising the steps of:

determining a material ablation rate from said workpiece when incised by said cutting beam;

defining a punch hole location within said portion and at a distance from said perimeter such that said material ablation rate and said spot size minimize distortion of said excision edge to less than a predetermined threshold value when said cutting beam cuts a pilot hole in said workpiece;

defining a laser beam path having a distance from said perimeter such that said material ablation rate and said spot size minimize distortion of said excision edge to less than said predetermined threshold value when said cutting beam progressively incises said workpiece;

defining a beam progression rate function for moving said cutting beam along said beam path as a function of the position of said beam respective to said perimeter such that said material ablation rate and said spot size minimize distortion of said excision edge to less than said predetermined threshold value as said cutting beam progressively incises said workpiece; and activating said laser tool to drill a punch hole at said punch hole location and to subsequently essentially continuously incise said workpiece along said beam path according to said progression rate function so that said portion is cut from said workpiece after said cutting beam has traversed said beam path.

12. The method of claim 11 wherein said beam path provides for convergent material removal to said perimeter so that said cutting beam progressively removes said material from said portion.

13. The method of claim 12 wherein convergent material removal proceeds by the steps of:

removing a subportion of said portion; and progressively removing the remainder of said portion to converge to said perimeter.

14. The method of claim 12 wherein removal is achieved with a spirally progressive beam path.

15. The method of claim 11 wherein said beam moves according to a trepanning progression.

16. The method of claim 11 further comprising the steps of:

providing a real-time control computer to operate said laser cutting tool; and programming said computer to control said cutting beam in accordance with said punch hole location, said beam path, and said beam progression rate function.

17. The method of claim 11 wherein said workpiece has a beam entrance surface and a beam exit surface, further comprising the steps of:

securing an etchable material layer to the beam exit surface of said workpiece;

controlling said continuous incision to cut through said workpiece to the interface between said workpiece and said etchable material; and etching away said etchable material after said cutting beam has fully traversed said beam path.

18. A method of cutting a discharge aperture in the nozzle plate body of an inkjet nozzle with a laser cutting tool, said aperture having a pre-determined perimeter defining the location of the edge of said aperture in said nozzle plate body, said laser cutting tool providing a cutting beam having a spot size, said method comprising the steps of:

determining a material ablation rate from said nozzle plate body when incised by said cutting beam;

defining a punch hole location within said nozzle plate body and within said perimeter at a distance from said perimeter such that said material ablation rate and said spot size minimize distortion of said edge to less than a predetermined threshold value when said cutting beam cuts a pilot hole in said nozzle plate body;

defining a laser beam path having a distance from said perimeter such that said material ablation rate and said spot size minimize distortion of said edge to less than said predetermined threshold value when said cutting beam progressively incises said nozzle plate body;

defining a beam progression rate function for moving said cutting beam along said beam path as a function of the position of said beam respective to said perimeter such that said material ablation rate and said spot size minimize distortion of said edge to less than said predetermined threshold value as said cutting beam progressively incises said nozzle plate body; and activating said laser tool to drill a punch hole in said nozzle plate body at said punch hole location and to subsequently essentially continuously incise said nozzle plate body along said beam path according to said progression rate function so that said aperture is cut into said nozzle plate body after said cutting beam has traversed said beam path.

19. The method of claim 18 wherein said beam path provides for convergent material removal to said perimeter so that said cutting beam progressively removes said material from said nozzle plate body.

20. The method of claim 19 wherein convergent material removal proceeds by the steps of:

removing a first portion of said nozzle plate body; and progressively removing the remainder of said nozzle plate body within said perimeter to converge to said perimeter in said nozzle plate body and thereby provide said aperture.

21. The method of claim 19 wherein removal is achieved with a spirally progressive beam path.

22. The method of claim 18 wherein said beam moves according to a trepanning progression.

23. The method of claim 18 further comprising the steps of:

providing a real-time control computer to operate said laser cutting tool; and programming said computer to control said cutting beam in accordance with said punch hole location, said beam path, and said beam progression rate function.

24. The method of claim 18 wherein said nozzle plate body has a beam entrance surface and a beam exit surface, further comprising the steps of:
- securing an etchable material layer to the beam exit surface of said nozzle plate body;
- controlling said continuous incision to cut through said nozzle plate body to the interface between said nozzle plate body and said etachable material; and
- etching away said etchable material after said cutting beam has fully traversed said beam path.

25. An in-kjet nozzle produced by the process of cutting a discharge aperture in an ink-jet nozzle nozzle plate body with a laser cutting tool, said aperture having a pre-determined perimeter defining the edge of said aperture in said nozzle plate body, said laser cutting tool providing a cutting beam having a spot size, said process comprising the steps of:
- determining a material ablation rate from said nozzle plate body when incised by said cutting beam;
- defining a punch hole location within said nozzle plate body at a distance from said perimeter such that said material ablation rate and said spot size minimize distortion of said edge to less than a predetermined threshold value when said cutting beam cuts a pilot hole in said nozzle plate body;
- defining a laser beam path having a distance from said perimeter such that said material ablation rate and said spot size minimize distortion of said edge to less than said predetermined threshold value when said cutting beam progressively incises said nozzle plate body;
- defining a beam progression rate function for moving said cutting beam along said beam path as a function of the position of said beam respective to said perimeter such that said material ablation rate and said spot size minimize distortion of said edge to less than said predetermined threshold value as said cutting beam progressively incises said nozzle plate body; and
- activating said laser tool to drill a punch hole in said nozzle plate body at said punch hole location and to subsequently essentially continuously incise said nozzle plate body along said beam path according to said progression rate function so that said portion is cut from said nozzle plate body after said cutting beam has traversed said beam path.

26. The nozzle made by the process of claim 25 wherein said beam path provides for convergent material removal to said perimeter so that said cutting beam progressively removes said material from said nozzle plate body.

27. The nozzle made by the process of claim 26 wherein convergent removal proceeds by the steps of:
- removing a first portion of said nozzle plate body; and
- progressively removing the remainder of said nozzle plate body within said perimeter to converge to said perimeter and thereby provide said aperture.

28. The nozzle made by the process of claim 26 wherein removal is achieved with a spirally progressive beam path.

29. The nozzle made by the process of claim 25 wherein said beam moves according to a trepanning progression.

30. The nozzle made by the process of claim 25 further comprising the steps of
- providing a real-time control computer to operate said laser cutting tool; and
- programming said computer to control said cutting beam in accordance with said punch hole location, said beam path, and said beam progression rate function.

31. The nozzle made by the process of claim 25 wherein said nozzle plate body has a beam entrance surface and a beam exit surface, further comprising the steps of:
- securing an etchable material layer to the beam exit surface of said nozzle plate body;
- controlling said incision to cut through said nozzle plate body to the interface between said nozzle plate body and said etachable material; and
- etching away said etchable material after said cutting beam has fully traversed said beam path.

32. A computer-implemented laser cutting apparatus for removing a portion from a workpiece, said portion having a pre-determined perimeter defining the outer boundary of said portion and a commensurate excision edge in said workpiece, said laser cutting tool providing a cutting beam having a spot size, said apparatus comprising:
- computer executable logic determining a material ablation rate from said workpiece when incised by said cutting beam;
- computer executable logic defining a punch hole location within said portion and at a distance from said perimeter such that said material ablation rate and said spot size minimize distortion of said excision edge to less than a predetermined threshold value when, said cutting beam cuts a pilot hole in said workpiece;
- computer executable logic defining a laser beam path having a distance from said perimeter such that said material ablation rate and said spot size minimize distortion of said excision edge to less than said predetermined threshold value when said cutting beam progressively incises said workpiece;
- computer executable logic defining a beam progression rate function for moving said cutting beam along said beam path as a function of the position of said beam respective to said perimeter such that said material ablation rate and said spot size minimize distortion of said excision edge to less than said predetermined threshold value as said cutting beam progressively incises said workpiece; and
- computer executable logic activating said laser tool to drill a punch hole at said punch hole location and to subsequently essentially continuously incise said workpiece along said beam path according to said progression rate function so that said portion is cut from said workpiece after said cutting beam has traversed said beam path, said computer executable logic activating said tool in data communication linkage with said computer executable logic defining said punch hole location, said computer executable logic defining said laser beam path, and said computer executable logic defining said beam progression rate function.

33. A computer-implemented laser cutting apparatus for removing a portion from a workpiece, said portion having a pre-determined perimeter defining the outer boundary of said portion and a commensurate excision edge to less than a predetermined threshold value in said workpiece, said laser cutting tool providing a cutting beam having a spot size, said apparatus comprising:
- means for determining a material ablation rate from said workpiece when incised by said cutting beam;
- means for defining a punch hole location within said portion and at a distance from said perimeter such that said material ablation rate and said spot size minimize distortion of said excision edge to less than a predetermined threshold value when said cutting beam cuts a pilot hole in said workpiece;

means for defining a laser beam path having a distance from said perimeter such that said material ablation rate and said spot size minimize distortion of said excision edge to less than said predetermined threshold value respective when said cutting beam progressively incises said workpiece;

means for defining a beam progression rate function for moving said cutting beam along said beam path as a function of the position of said beam respective to said perimeter such that said material ablation rate and said spot size minimize distortion of said excision edge to less than said predetermined threshold value as said cutting beam progressively incises said workpiece; and means for activating said laser tool to drill a punch hole at said punch hole location and to subsequently essentially continuously incise said workpiece along said beam path according to said progression rate function so that said portion is cut from said workpiece after said cutting beam has traversed said beam path, said means for activating in data communication with said punch hole location defining means, said laser beam path defining means, and said beam progression rate function defining means.

* * * * *

UNITED STATES PATENT AND TRADEMARK OFFICE
CERTIFICATE OF CORRECTION

PATENT NO. : 6,749,285 B2
DATED : June 15, 2004
INVENTOR(S) : Liu et al.

It is certified that error appears in the above-identified patent and that said Letters Patent is hereby corrected as shown below:

Column 13,
Line 13, "nozzle nozzle" should be -- nozzle --

Signed and Sealed this

Thirtieth Day of November, 2004

JON W. DUDAS
*Director of the United States Patent and Trademark Office*